United States Patent
Louie et al.

(10) Patent No.: US 8,985,174 B2
(45) Date of Patent: Mar. 24, 2015

(54) INTEGRALLY STIFFENED, REUSABLE VACUUM BAG AND METHOD OF MAKING THE SAME

(75) Inventors: Michael Kenneth-Que Louie, Renton, WA (US); Kenneth M. Dull, Puyallup, WA (US); Timothy David Aquino, Olympia, WA (US)

(73) Assignee: The Boeing Company, Chicago, IL (US)

( * ) Notice: Subject to any disclaimer, the term of this patent is extended or adjusted under 35 U.S.C. 154(b) by 177 days.

(21) Appl. No.: 13/218,793

(22) Filed: Aug. 26, 2011

(65) Prior Publication Data

US 2013/0048212 A1 Feb. 28, 2013

(51) Int. Cl.

| B32B 37/10 | (2006.01) |
|---|---|
| B29C 33/00 | (2006.01) |
| B29C 33/40 | (2006.01) |
| B29C 41/00 | (2006.01) |
| B29C 41/08 | (2006.01) |
| B29C 41/20 | (2006.01) |
| B29C 70/70 | (2006.01) |
| B29C 70/44 | (2006.01) |
| B29K 83/00 | (2006.01) |

(52) U.S. Cl.
CPC ......... *B29C 33/0011* (2013.01); *B29C 33/0038* (2013.01); *B29C 33/405* (2013.01); *B29C 41/003* (2013.01); *B29C 41/08* (2013.01); *B29C 41/20* (2013.01); *B29C 70/70* (2013.01); *B29C 70/44* (2013.01); *B29K 2083/005* (2013.01)
USPC ........ 156/381; 156/285; 425/389; 425/405.1; 425/405.2

(58) Field of Classification Search
CPC ............... B29C 43/3642; B29C 2043/3644; B29C 2043/3647; B29C 51/28; B29C 70/44; B30B 5/02; B30B 9/22; B32B 37/10
USPC ............ 156/285, 381; 425/389, 405.1, 405.2
See application file for complete search history.

(56) References Cited

U.S. PATENT DOCUMENTS

| 4,078,962 A | * | 3/1978 | Krueger ..................... 156/497 |
|---|---|---|---|
| 4,425,406 A | * | 1/1984 | Palma ............................ 428/12 |
| 4,698,115 A | | 10/1987 | Dodds |
| 5,316,462 A | | 5/1994 | Seemann |
| 5,370,598 A | | 12/1994 | Corneau, Jr. |
| 5,716,488 A | | 2/1998 | Bryant |
| 5,807,593 A | | 9/1998 | Thompson |
| 6,551,091 B1 | | 4/2003 | Bryant et al. |
| 6,851,945 B2 | | 2/2005 | Potter et al. |
| 7,029,267 B2 | | 4/2006 | Caron |

(Continued)

FOREIGN PATENT DOCUMENTS

| DE | 3145698 A1 | 5/1983 |
|---|---|---|
| WO | WO2008103485 A1 | 8/2008 |
| WO | WO2010064928 A1 | 6/2010 |

OTHER PUBLICATIONS

EP search report dated Feb. 4, 2013 regarding application 12181756.3, reference P55452EP/RGH, applicant The Boeing Company, 8 pages.

(Continued)

*Primary Examiner* — Christopher Schatz
(74) *Attorney, Agent, or Firm* — Yee & Associates, P.C.

(57) ABSTRACT

A reusable vacuum bag for processing parts is made by encapsulating a generally rigid frame within a flexible diaphragm.

18 Claims, 7 Drawing Sheets

(56) References Cited

U.S. PATENT DOCUMENTS

2007/0296126 A1    12/2007   Audette
2008/0106007 A1     5/2008   Kipp et al.
2008/0211130 A1*   9/2008   Rydin et al. .................. 264/102
2008/0308960 A1    12/2008   Rydin et al.
2008/0314497 A1*   12/2008   Pettersen et al. ............. 156/62.2

OTHER PUBLICATIONS

"Designing Molds and Fixtures for Reusable Vacuum Bagging Systems," Torr Technologies, Inc., XP-002690808, Aug. 2004, 12 pages, retrieved Jan. 23, 2013, http://www.torrtech.com/PDFs/TorrMDG.pdf.

* cited by examiner

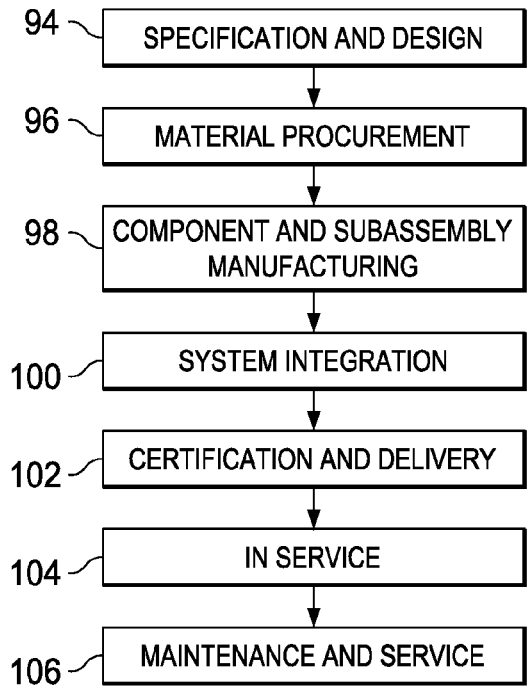
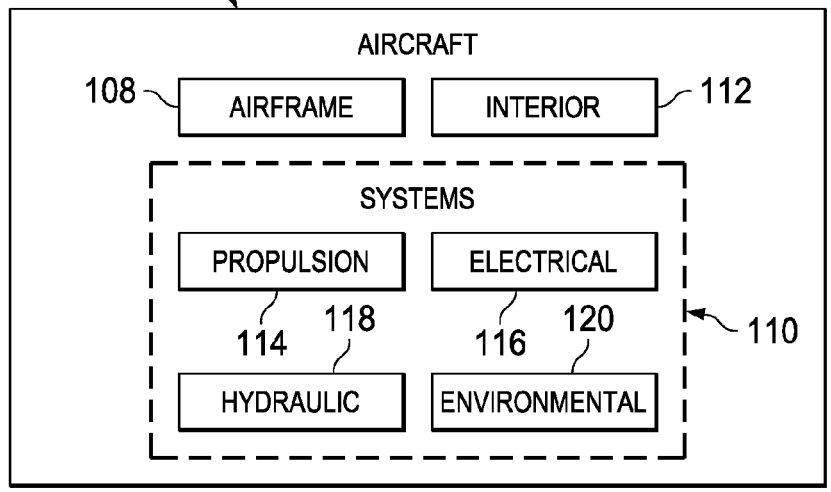

INTEGRALLY STIFFENED, REUSABLE VACUUM BAG AND METHOD OF MAKING THE SAME

BACKGROUND INFORMATION

1. Field

The present disclosure generally relates to equipment used to fabricate composite parts, and deal more particularly with a vacuum bag used to compress composite part layups.

2. Background

Flexible vacuum bags may be used to process parts in a wide variety of applications. In the composites industry, vacuum bags are used to consolidate, laminate, mold or bond composite parts using a vacuum drawn within the bag to apply atmospheric pressure to the parts. The bag comprises a flexible membrane or diaphragm that may be an extruded polymer film such as nylon.

Polymer film type vacuum bags are typically not re-usable and must be discarded after each use, thus representing a recurring production cost. Reusable type vacuum bags are known which employ a rubber coated fabric or film, however these types of bags, which typically employ stiffening structures, are relatively complex, heavy and relatively expensive to fabricate. For example, reusable elastomeric type vacuum bags are fabricated using metallic stiffening frames. Separate bonding operations are required to attach the bag diaphragm, seal and frame to each other. Each component is fabricated separately, and the tooling used to produce the bags must be oversized in order to allow for shrinkage of the bag diaphragm during fabrication.

Accordingly, there is a need for an improved, reusable, integrally stiffened vacuum bag that reduces the number of steps required for its fabrication, while reducing weight and complexity of the bag.

SUMMARY

The disclosed embodiments provide an integrally stiffened, reusable vacuum bag, and related method of making the same, which reduce the number of fabrication steps and parts, thereby reducing costs. The bag is integrally stiffened with a rigid, peripheral frame that is encapsulated in the bag diaphragm, thereby eliminating the need for a separate operation to join the stiffener to the bag diaphragm. A peripheral bag seal may be integrally formed with the bag diaphragm, thereby eliminating the need for a separate bonding operation to attach the seal to the bag assembly. In one embodiment, the reusable vacuum bag may be fabricated on the layup tool that is used to layup and/or cure a composite part, thus eliminating the need for a separate tool to fabricate the vacuum bag. Relatively large, lightweight reusable vacuum bags may be fabricated that avoid the need for heavy outer support frames.

According to one disclosed embodiment, a vacuum bag for processing parts is provided comprising a flexible diaphragm and a generally rigid frame. The diaphragm is adapted to be placed over a part, and the frame is encapsulated within the diaphragm. The bag may comprise an elastomeric material such as a room curable RTV silicone. The frame may comprise a composite that extends around the periphery of the diaphragm and has its sides covered by the diaphragm. The vacuum bag may further comprise a seal for sealing the diaphragm against a surface during processing of the part. The seal may be formed integral with the diaphragm or alternatively, may be bonded to the frame.

According to another disclosed embodiment, an integrally stiffened, reusable vacuum bag for processing parts comprises a flexible diaphragm having an integral stiffener around its periphery. The bag may further comprise a seal integral with and extending around the periphery of the diaphragm for sealing the diaphragm against the surface during processing of the part. The stiffener may include a generally rigid frame encapsulated in the diaphragm which may comprise a vulcanized elastomer.

According to a further embodiment, a method is provided of making a vacuum bag for processing parts. The method comprises forming a flexible diaphragm, and encapsulating a generally rigid frame within the diaphragm. Forming the diaphragm may include coating a tool surface with an elastomer, and encapsulating the frame includes placing the frame on the elastomer coating and applying additional elastomer over the frame. The method may further comprise forming a seal integrally with the diaphragm. Forming the seal may include placing a seal element on a tool surface, and forming the diaphragm may include spraying a coating of elastomer over the tool surface covering the seal. The method may further comprise co-curing the seal and the elastomer coating.

According to still another embodiment, a method is provided of making an integrally stiffened, reusable vacuum bag for processing parts. The method comprises fabricating a generally rigid frame, and forming a diaphragm by spraying a first coating of an elastomer over a tool surface. The method also comprises placing the frame on the diaphragm, and encapsulating the frame with elastomer by spraying a second coating of the elastomer over the frame and onto the diaphragm. The method also includes co-curing the first and second elastomer coatings. The method may further comprises placing a seal on the tool surface, wherein spraying the first coating includes spraying the elastomer over the seal, and co-curing the first and second coatings and the seal.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 18 is an illustration of a flow diagram of aircraft production and service methodology.

FIG. 19 is an illustration of a block diagram of an aircraft.

DETAILED DESCRIPTION

Figure 1:
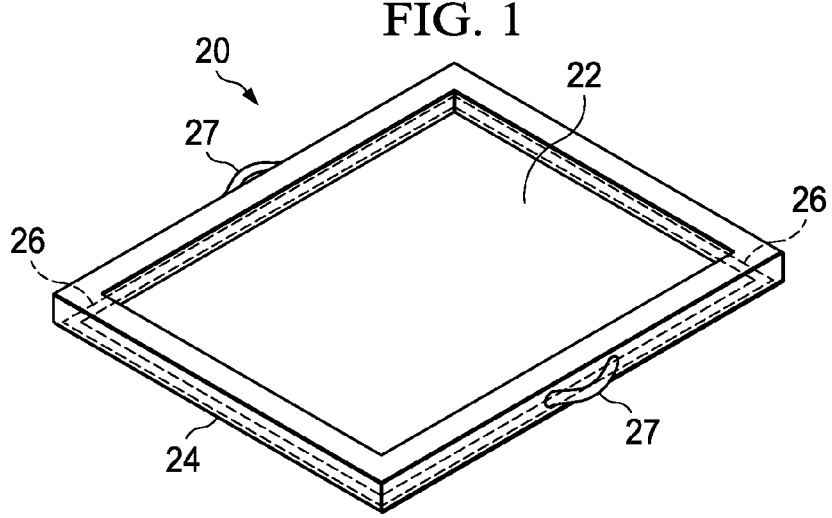
FIG. 1 is an illustration of a perspective view of an integrally stiffened, reusable vacuum bag according to the disclosed embodiments.
Figure 2:
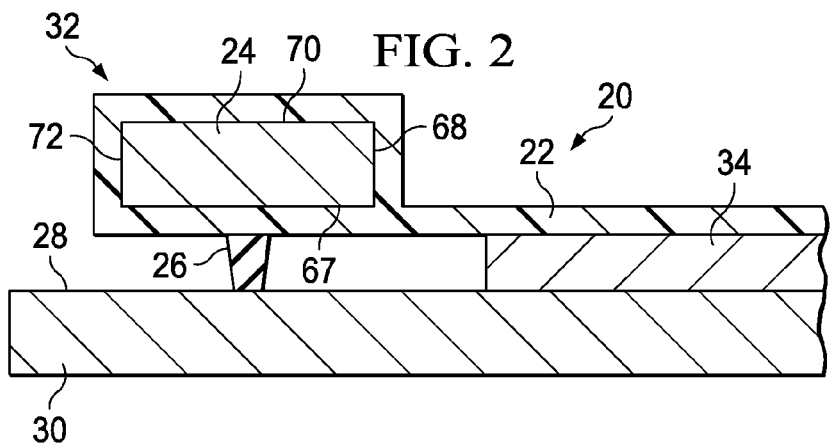
FIG. 2 is an illustration of a sectional view of an edge of a composite layup assembly, showing the bag installed over a composite part layup on a tool.

Referring first to FIGS. 1 and 2, the disclosed embodiments relate to an integrally stiffened, reusable vacuum bag 20 that may be used, for example and without limitation, to consolidate and/or compress a composite part 34 on a tool 30. The bag 20 includes a generally planar, elastic bag diaphragm 22 having dimensions that are suited to the particular application, covering the part 34. The bag 20 also includes an outer frame 24 and a peripheral seal 26 beneath the frame 24 which seals the bag diaphragm 22 against a tool surface 28. The frame 24 may be manufactured of any suitable rigid or semi-rigid material, such as a composite or a lightweight metal, and may be provided with attachments such as handles 27 to aid in handling or manipulating the bag 20. In the illustrated embodiment, the frame 24 is generally rectangular, however it may have other shapes that are suited to the geometry of the composite part 34 being processed. The frame 24 has a generally rectangular cross section, as shown in FIG. 2, however other cross sectional shapes are possible.

The diaphragm 22 extends outwardly across the bottom 67 of the frame 24, and encapsulates 32 the sides 68, 72 and top 70 of the frame 24. Encapsulation 32 of the frame 24 within the diaphragm 22 essentially provides the elastic diaphragm 22 with integral stiffening that allows the bag 20 to be easily handled and manipulated. The seal 26 extends around the entire periphery of the composite part 34 and creates an air tight seal between the bag diaphragm 22 and the upper surface 28 of the tool 30, allowing a vacuum to be drawn within the bag 22. As will be discussed below, in one embodiment, the seal 26 is formed integral with the bag 22, while in another embodiment, the seal 26 is bonded to the frame 24 in a separate fabrication operation.

Figure 3:
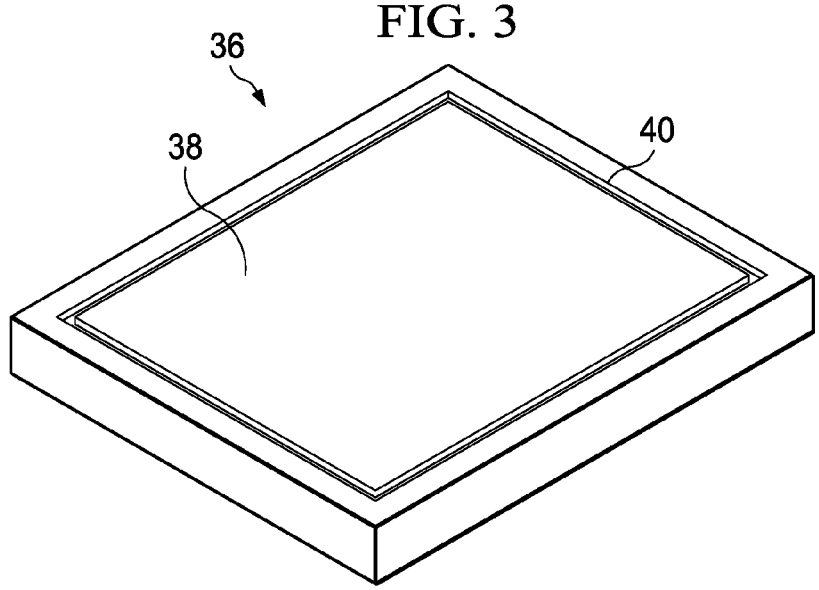
FIG. 3 is an illustration of a perspective view of a tool used to make the vacuum bag shown in FIGS. 1 and 2.

Referring to FIG. 3, in one method embodiment, the vacuum bag 20 is fabricated using a tool 36 having a generally flat tool surface 38 and a peripheral groove 40. In other embodiments, the vacuum bag 20 may be fabricated using the same tool 30 that is used to process the composite part 34.

Figure 4:
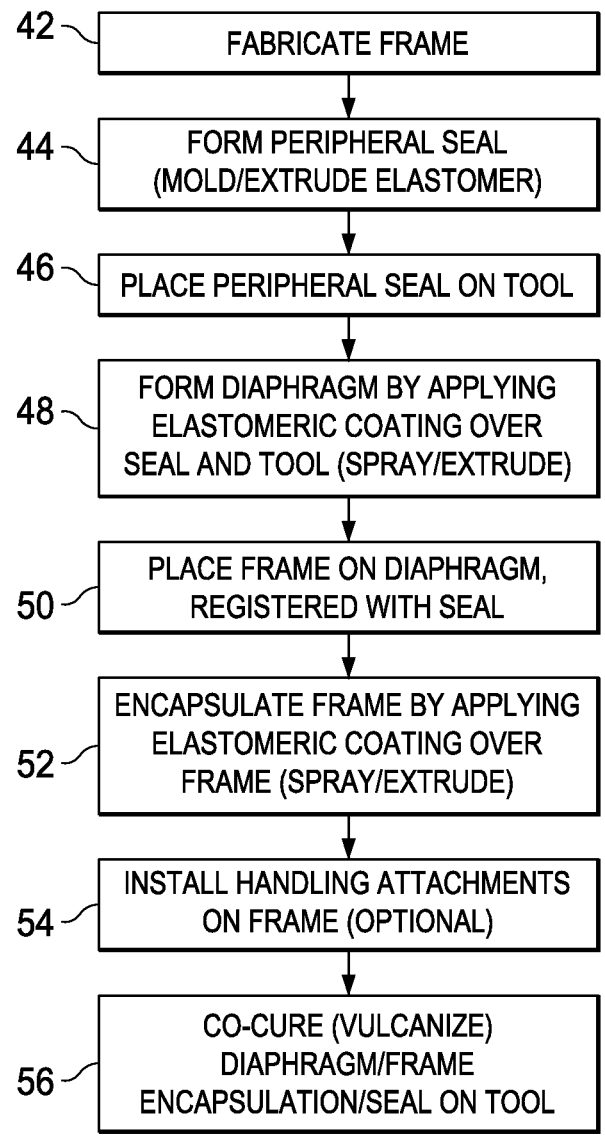
FIG. 4 is an illustration of a flow diagram showing the steps of a method of making a reusable vacuum bag having an integrated seal.
Figure 5:
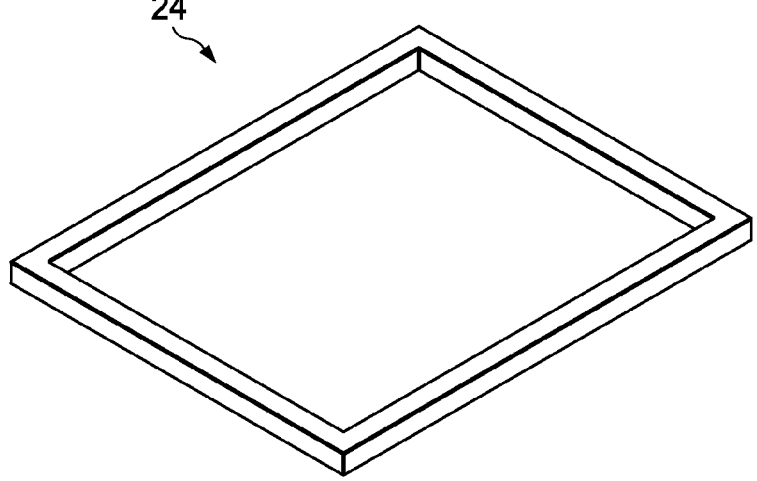
FIG. 5 is an illustration of a perspective view of a stiffening frame prior to being assembled with the bag.
Figure 6:
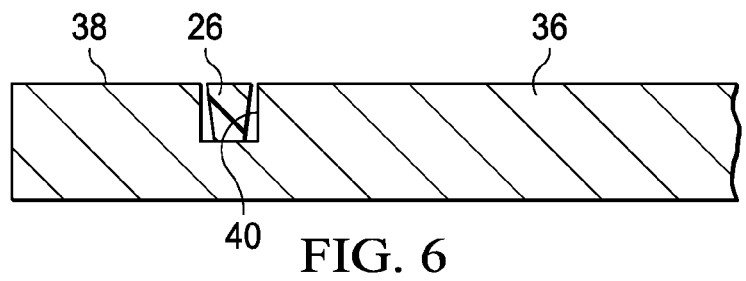
FIGS. 6-11 are illustrations of cross sectional views diagrammatically showing the sequential steps of the method of FIG. 5.
Figure 7:
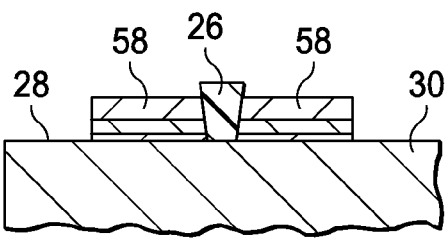
Figure 8:
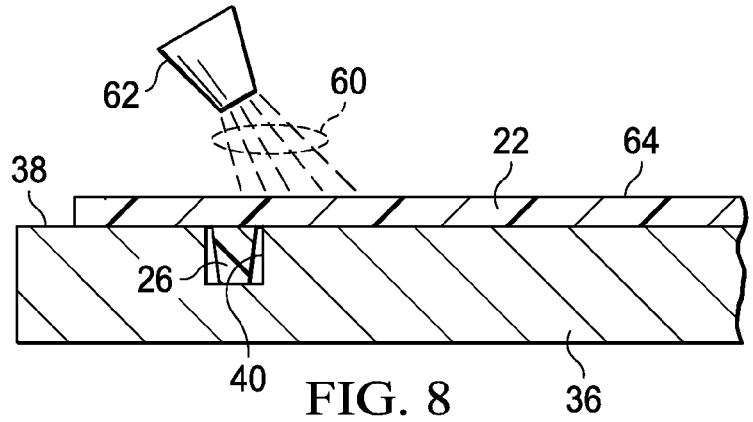

Attention is now directed to FIG. 4, along with FIGS. 5-11 which sequentially illustrate the steps of one method of fabricating the vacuum bag 20 shown in FIGS. 1 and 2. Beginning at step 42, the frame 24 is fabricated (FIG. 5) using any of various fabrication techniques, including laminating and curing prepreg fiber. Where the frame 24 is formed of the composite, it may be laid up on either tool 30 (FIG. 2) or tool 36 (FIG. 3). Next, at step 44, a peripheral seal 26 is fabricated using a suitable elastic material such as an elastomer that is molded or extruded into the desired cross section. As used herein, "elastomer" and "elastomeric" refer to natural and synthetic polymers that exhibit elastic properties, similar to natural rubber. For example, and without limitation, the elastomer may comprise a thermoset or a thermoplastic that can stretch and return substantially to its original shape without material deformation. At step 44 the seal 26 may be placed in a groove 40 (FIG. 6) of tool 36 such that the seal 26 is generally coplanar with the upper surface 38 of the tool 36. The groove 40 assists in holding and stabilizing the seal 26 during subsequent processing steps. Alternatively, as shown in FIG. 7, where the vacuum bag is fabricated directly on the layup tool 30 used to fabricate the composite part 34 (FIG. 2), shims 58 may be placed on the tool surface 28 surrounding the seal 26 in order to stabilize and hold the seal 26 during subsequent processing operations.

Referring now again to FIG. 4, the diaphragm 22 (FIG. 8) is formed by applying a first elastomeric coating 64 over the surface 38 of tool 36. The application of the first coating 64 may be performed by spraying 60 an elastomer from a spray head 62 over tool surface 38. The first coating 64 extends over the seal 26. In one embodiment, the first elastomeric coating 64 may comprise a sprayable, RTV catalyzed silicone, which may be a one or two part system that cures relatively quickly at room temperature, without the need for oven or autoclave processing, and exhibits little or no shrinkage following curing. Other forms of elastomers are possible, some of which may require curing at elevated temperatures using an oven or other suitable heating devices. In one embodiment, the seal 26 is formed from an elastomer that is substantially identical to the elastomer used in the first elastomeric coating 64 forming the diaphragm 22. Other techniques for applying the first coating 64 may be used, including but not limited to extrusion.

Figure 9:
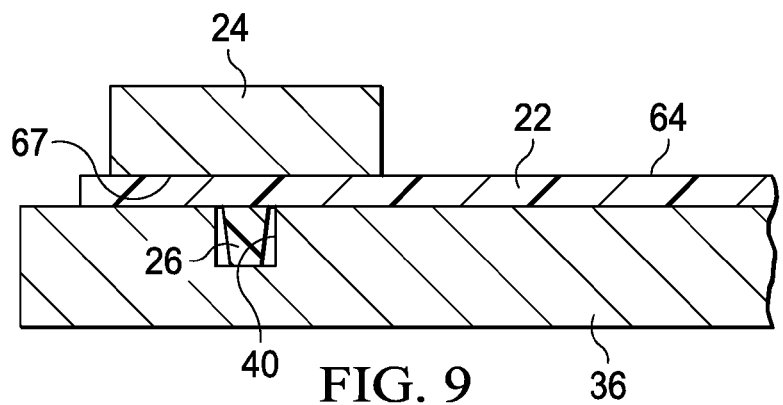
Figure 10:
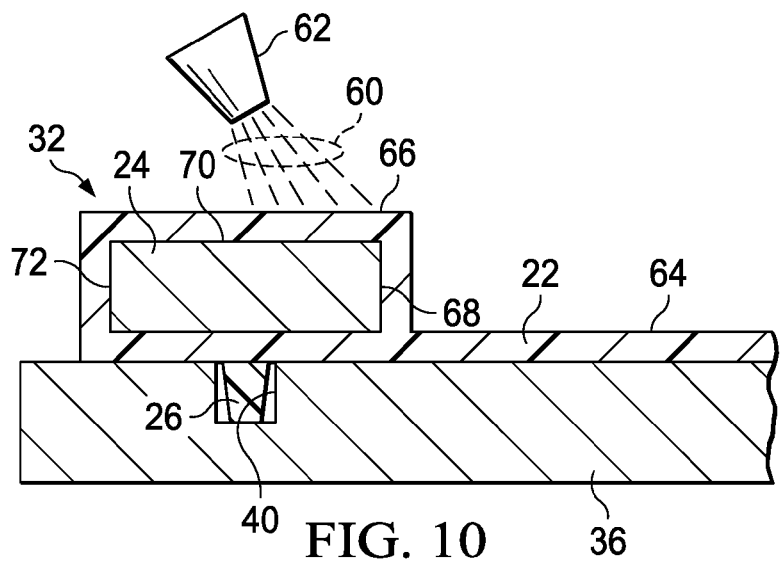
Figure 11:
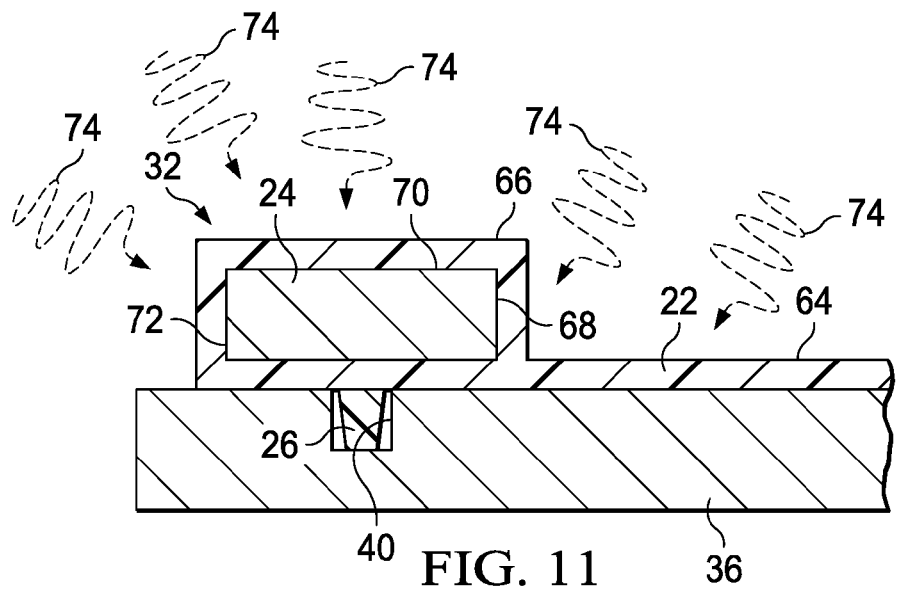

At step 50 (FIG. 4), the frame 24 is placed on the diaphragm 22, as shown in FIG. 9, with the frame bottom 67 generally overlying and registered with the peripheral position of the seal 26. Next, at step 52 in FIG. 4, the frame 24 is encapsulated 32 (FIG. 10) with an elastomer, by applying, as by spraying 60 a second elastomeric coating 66 over the exposed sides 68, 72 and top 70 of the frame 24. The second coating 66 extends over onto the first coating 64 previously applied. Thus, in this embodiment, the diaphragm 22 along with the seal 26 and the encapsulation 32 on the frame 24 are formed of substantially the same material, which at this point in the fabrication process, are uncured. At step 54, optionally, suitable hardware or handling attachments, such as handles 27 shown in FIG. 1, may be attached to the frame 24. Finally, at step 56 shown in FIG. 4, the diaphragm 22, frame encapsulation 32 and the seal 26 are cocured or vulcanized through the application of heat 74. As previously discussed, where a suitable RTV silicone elastomer is used, the heat 74 may comprise room temperature heat. Cocuring integrates the diaphragm 22, the encapsulation 32 around the frame 24 and the seal 26 into a continuous, unitary viscoelastic structure.

Figure 12:
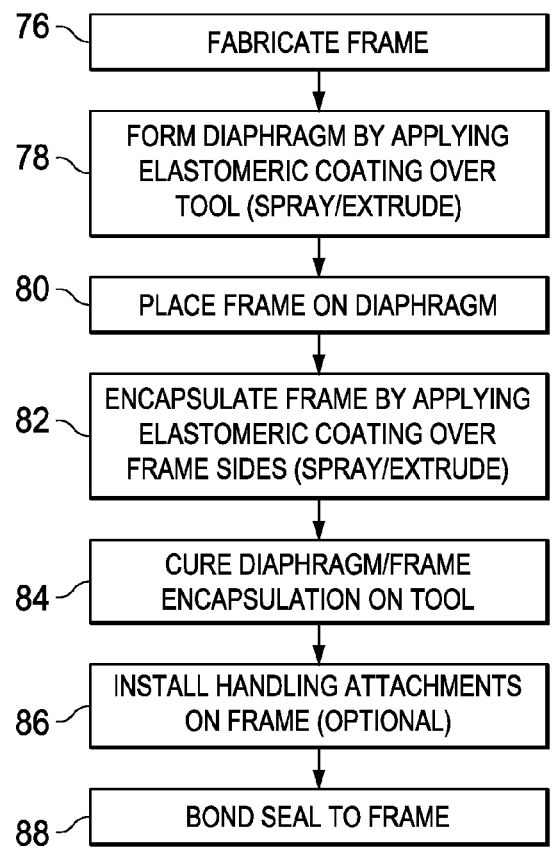
FIG. 12 is an illustration of a flow diagram showing the steps of an alternate method of making a reusable bag having a bonded seal.
Figure 13:
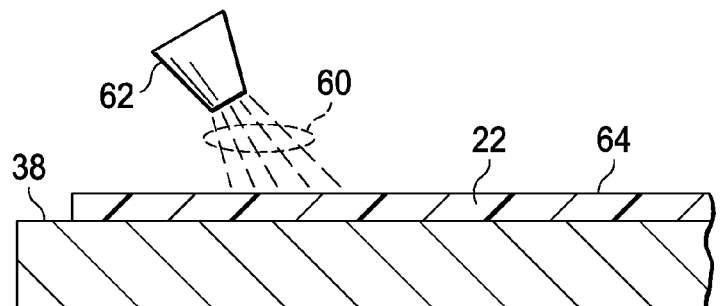
FIGS. 13-17 are illustrations of cross sectional views diagrammatically showing the sequential steps of the method of FIG. 12.
Figure 14:
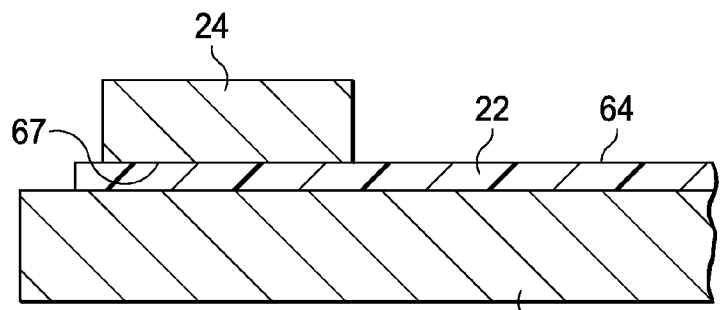
Figure 15:
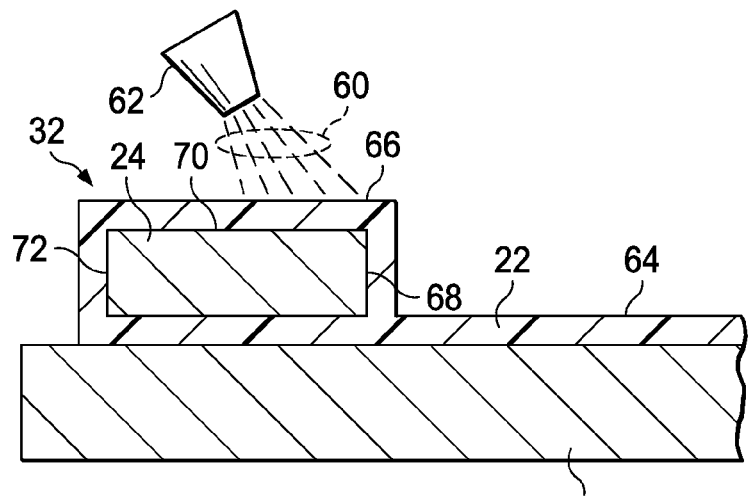
Figure 16:
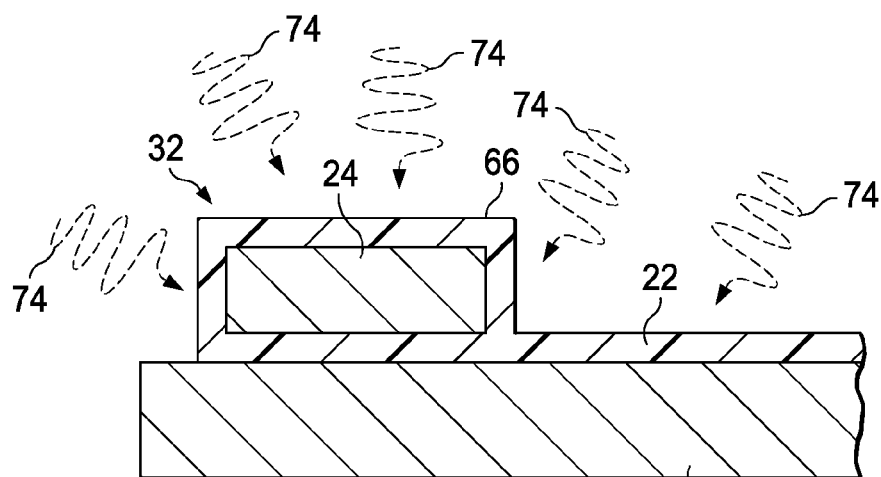
Figure 17:
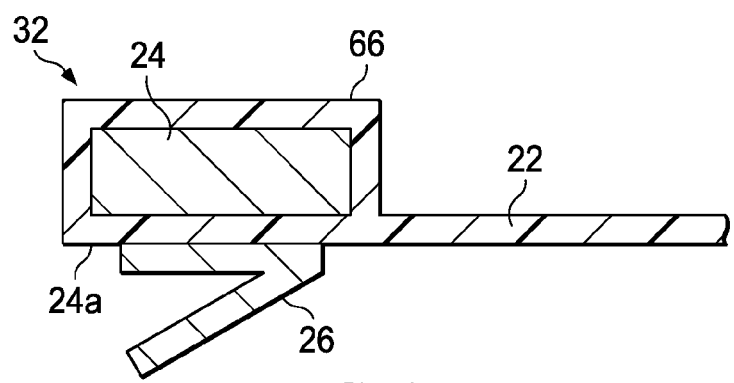

Attention is now directed to FIG. 12 which, along with FIGS. 13-17, illustrates the steps of another method of fabricating the vacuum bag 20. At 76, a suitable frame 24 is fabricated following which at 78 a diaphragm 22 (FIG. 13) is formed by applying an elastomeric coating 64 over the tool surface 38, either by spraying 60, extruding or other application techniques. Next, at step 80, the frame 24 (FIG. 14) is placed on the outer periphery of the diaphragm 22, in contact with the first elastomeric coating 64. At step 82, the frame 24 is encapsulated 32 by applying a second elastomeric coating 66 over the sides 68, 72 and top 70 of the frame 24, as shown in FIG. 15. The second coating 66 may be applied as by spraying 60, from a spray head 62 or by using other techniques including but not limited to extrusion. The second coating 66 both covers the sides 68, 72 and top 70 of the frame 24, and joins with and overlies the first coating 64, forming a substantially, one-piece, unitary structure following curing.

At step 84 shown in FIG. 12, the diaphragm 22 along with the encapsulation 32 surrounding the frame 24 are cured (FIG. 16) by applying heat 74 to the elastomer coatings 64, 66. As previously mentioned as in connection with the embodiments shown in FIGS. 4-11, the elastomer may comprise an RTV silicone that cures at room temperature. At step 86 suitable hardware or attachments may be installed on the frame 24 as previously described. At step 88 shown in FIG. 12, a seal 26 (FIG. 17) is bonded to the lower surface 24a of the diaphragm 26, beneath the frame 24, using any suitable techniques, such as using a bonding adhesive. The seal 26 may or may not be formed of a material that is the same as that of the diaphragm 26.

Embodiments of the disclosure may find use in a variety of potential applications, particularly in the transportation industry, including for example, aerospace, marine, automotive applications and other application where automated layup equipment may be used. Thus, referring now to FIGS. 18 and 19, embodiments of the disclosure may be used in the context of an aircraft manufacturing and service method 90 as shown in FIG. 18 and an aircraft 92 as shown in FIG. 19. Aircraft applications of the disclosed embodiments may include, for example, without limitation, layup of stiffener members such as, without limitation frames, stiffeners, hatches, spars and stringers, to name only a few. During pre-production, exemplary method 90 may include specification and design 94 of the aircraft 92 and material procurement 96. During production, component and subassembly manufacturing 98 and system integration 100 of the aircraft 92 takes place. Thereafter, the aircraft 92 may go through certification and delivery 102 in order to be placed in service 104. While in service by a customer, the aircraft 92 is scheduled for routine maintenance and service 106, which may also include modification, reconfiguration, refurbishment, and so on.

Each of the processes of method 90 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 19, the aircraft 92 produced by exemplary method 90 may include an airframe 108 with a plurality of systems 110 and an interior 112. Examples of high-level systems 110 include one or more of a propulsion system 114, an electrical system 116, a hydraulic system 118, and an environmental system 120. Any number of other systems may be included. Although an aerospace example is shown, the principles of the disclosure may be applied to other industries, such as the marine and automotive industries.

Systems and methods embodied herein may be employed during any one or more of the stages of the production and service method 90. For example, components or subassemblies corresponding to production process 98 may be fabricated or manufactured in a manner similar to components or subassemblies produced while the aircraft 92 is in service. Also, one or more apparatus embodiments, method embodiments, or a combination thereof may be utilized during the production stages 98 and 100, for example, by substantially expediting assembly of or reducing the cost of an aircraft 92. Similarly, one or more of apparatus embodiments, method embodiments, or a combination thereof may be utilized while the aircraft 92 is in service, for example and without limitation, to maintenance and service 106.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A vacuum bag for processing a part, comprising:
    a flexible diaphragm adapted to be placed over the part, the flexible diaphragm comprising RTV silicone;
    a frame having a plurality of sides and the diaphragm disposed so as to completely encapsulate the frame and contacting each of the plurality of sides, the frame being substantially planar; and
    a seal connected to the diaphragm, the seal configured to seal the diaphragm against a surface of a tool upon which the part is positioned such that vacuum drawn between the diaphragm and the surface compresses the part against the tool, the seal positioned substantially between the frame and the tool, and the seal being cocured with the diaphragm.

2. The vacuum bag of claim 1, wherein the frame is a composite.

3. The vacuum bag of claim 1, wherein the seal is formed integral with the diaphragm.

4. The vacuum bag of claim 1 wherein the seal is attached to the flexible diaphragm and is disposed under the frame.

5. The vacuum bag of claim 1, wherein the frame comprises four sides and the diaphragm contacts each of the four sides.

6. A reusable vacuum bag for processing parts, comprising:
    a flexible diaphragm configured to press against a surface of a part, the diaphragm being substantially planar and comprising RTV silicone;
    a rigid frame comprising a plurality of walls, the diaphragm completely encapsulating and contacting each of the plurality of walls; and
    a seal connected to the diaphragm, the seal configured to provide sealing against a tool, the seal positioned between the frame and the tool, and the seal being cocured with the diaphragm.

7. The vacuum bag of claim 6, further comprising the seal integral with and extending around the periphery of the diaphragm for sealing the diaphragm against a surface of the tool during processing of the part.

8. The vacuum bag of claim 6, wherein the frame comprises a rigid material having a rectangular, planar configuration.

9. An assembly for compressing a composite part layup on a layup tool, comprising: a composite frame having a bottom and at least three sides, the frame being substantially rigid, planar, and rectangular; a flexible bag diaphragm formed of vulcanized RTV silicone extending across the bottom of the frame; an encapsulation comprising RTV silicone completely encapsulating the composite frame and contacting the bottom and the at least three sides of the composite frame; a layup tool, the composite part layup resting on the layup tool; and a seal formed of RTV silicone sealing the flexible bag diaphragm against the layup tool, the seal being integral with the bag diaphragm and located beneath the bottom of the frame and the seal, the flexible bag diaphragm, and the encapsulation being cocured.

10. The vacuum bag of claim 1 wherein the frame is substantially rigid.

11. The vacuum bag of claim 6, wherein the frame comprises at least three walls, and the diaphragm contacts each of the three walls.

12. The vacuum bag of claim 1 further comprising a handle attached to the frame.

13. The vacuum bag of claim 1, wherein the frame is substantially rectangular and planar.

14. The vacuum bag of claim 1, wherein the RTV silicone comprises sprayed RTV silicone cured at room temperature.

15. The vacuum bag of claim 1, wherein the diaphragm, the frame, and the seal are reusable.

16. The vacuum bag of claim 6, wherein the seal is configured to seal the diaphragm against a surface of the tool upon which the part is positioned such that vacuum drawn between the diaphragm and the surface of the tool compresses the part against the tool.

17. diaphragm and the surface of the layup tool compresses the part against the layup tool.

18. The vacuum bag of claim 17, wherein the diaphragm, the frame, and the seal are reusable.

* * * * *